United States Patent [19]

Markland et al.

[11] 4,067,235
[45] Jan. 10, 1978

[54] METHOD AND APPARATUS FOR MEASURING AIR PRESSURE IN PNEUMATIC TIRES

[75] Inventors: Richard Donald Markland, Cupertino; Frank Fred Stucki, Portola Valley; Paul Max Bryant, San Jose, all of Calif.

[73] Assignee: Consolidated Freightways, Inc., San Francisco, Calif.

[21] Appl. No.: 527,641

[22] Filed: Nov. 27, 1974

[51] Int. Cl.$^2$ .......................... B60C 23/02; G01L 9/10
[52] U.S. Cl. ........................................ 73/146.5; 340/58
[58] Field of Search ............... 73/146.5, 146.4, 398 R; 340/58

[56] References Cited
U.S. PATENT DOCUMENTS

| | | | |
|---|---|---|---|
| 3,665,388 | 5/1972 | Johnson | 340/58 |
| 3,723,966 | 3/1973 | Mueller et al. | 340/58 |
| 3,760,351 | 9/1973 | Thomas | 340/58 |
| 3,787,806 | 1/1974 | Church | 73/146.5 |
| 3,840,850 | 10/1974 | Whiteing et al. | 73/146.5 |

*Primary Examiner*—Donald O. Woodiel
*Attorney, Agent, or Firm*—Flehr, Hohbach, Test, Albritton & Herbert

[57] ABSTRACT

System for remotely measuring the air pressure in pneumatic tires. The system includes a stationary power transmitter that generates an electromagnetic field in the roadway with a flat coil antenna. Located in the pneumatic tire is a pressure sensor comprising a pressure transducer and a signal transmitter both powered by the energy obtained from the electromagnetic field in the roadway. The pressure sensor does not use a battery and has no external physical connections outside of the tire. The pressure sensor transmits a low frequency FM signal to a stationary tire pressure signal processor. The signal processor generates quantitative signals representing the pressure in the tire, visually displays these signals, and passes the signals to a computer. By means of various antenna configurations the system can distinguish between tires mounted both in side by side and in tandem relationship. Moreover, by coding the FM signal the system can uniquely identify the vehicle as well as every tire thereon. In an additional embodiment the pressure sensor is powered by a current induced from a magnetic field. The sensor in the tire is rotated through a stationary magnetic field generated by permanent magnets attached to the vehicle.

69 Claims, 16 Drawing Figures

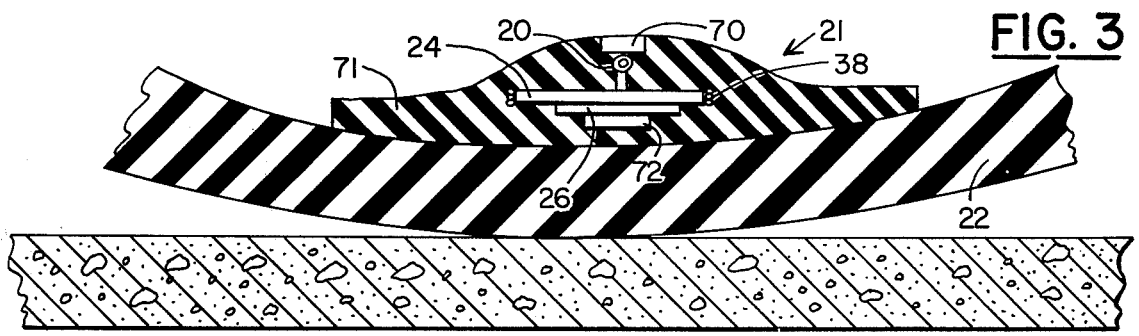
FIG. 3
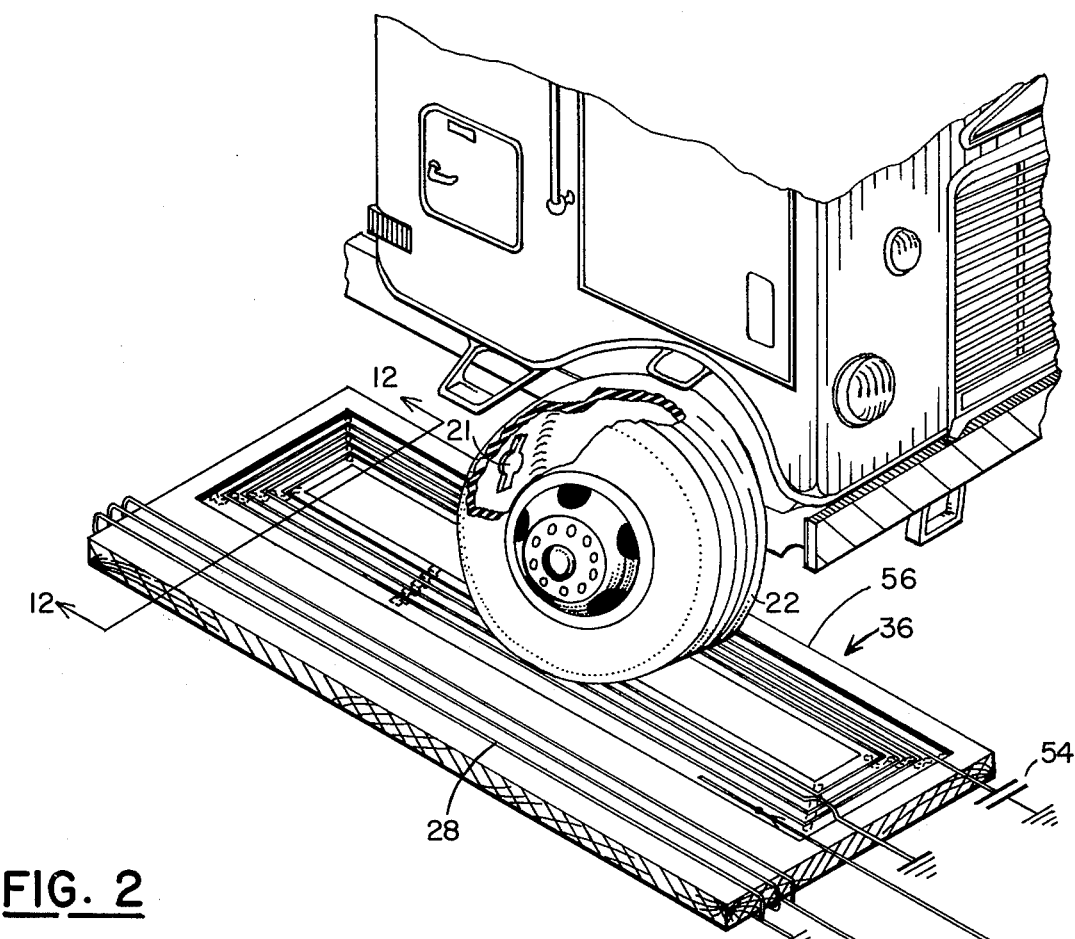
FIG. 2
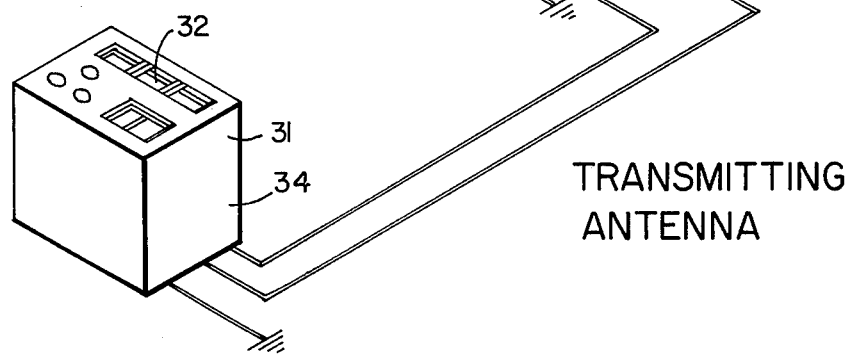
TRANSMITTING ANTENNA

REMOTE TIRE PRESSURE SENSOR 21

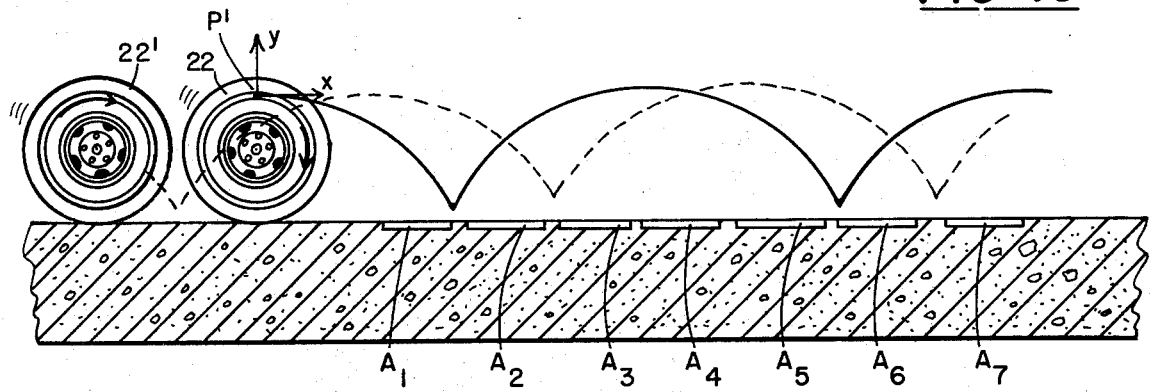
FIG. 10
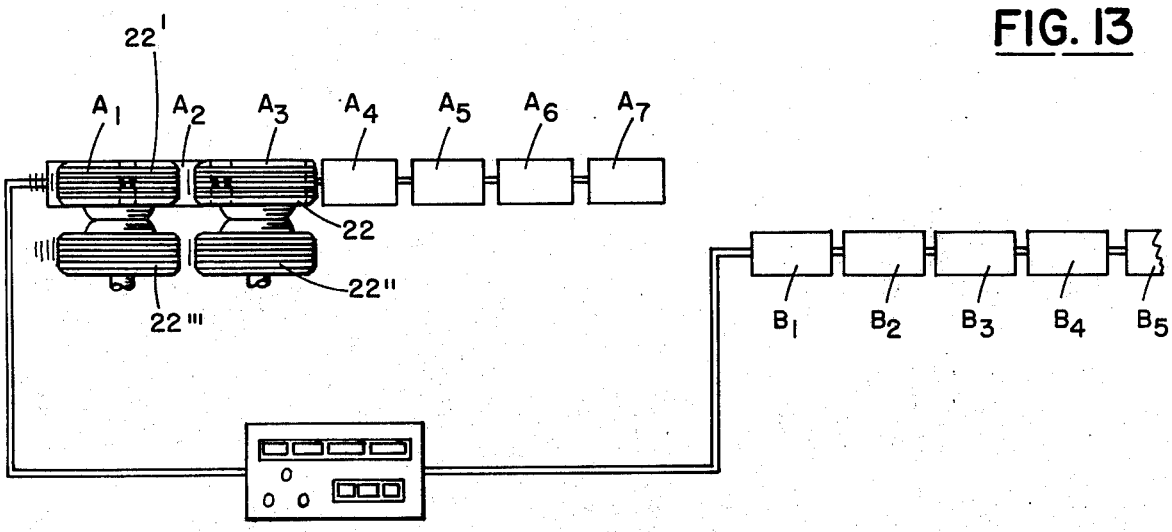
FIG. 12
FIG. 13
FIG. 11

METHOD AND APPARATUS FOR MEASURING AIR PRESSURE IN PNEUMATIC TIRES

FIELD OF THE INVENTION

This invention generally relates to air pressure measuring systems and, more particularly, to systems for measuring such pressures in penumatic tires.

DESCRIPTION OF THE PRIOR ART

In the past the most common device for measuring the air pressure in pneumatic tires was the portable, hand held, mechanical pressure gauge. This mechanical gauge included a pressure sensor, resetable indicator, and a pressure fitting for engaging the pressure sensor to the stem of the tire. The pressure is measured by engaging the portable gauge with each tire stem and thereafter visually observing the air pressure recorded on the resetable indicator. Although these manual gauges are quite reliable, the operator must physically engage the pressure gauge to the stem of each tire for a pressure measurement. When there are many tires to be measured and when the tires are mounted in pairs, these measurements are quite time consuming and inconvenient.

More recently, a mechanical system has been suggested that is attached to the tire stem and remains permanently fixed to the tire. This mechanical system includes a pressure sensor that can be observed by the operator from the roadside. Although this system overcomes the inconvenience of individually measuring the pressure in each tire, the system is not completely reliable and is insensitive to small variations in pressure. More specifically, any mechanical pressure measuring system that remains attached to the tire during operation is subjected to large centrifugal forces that can cause insensitivity and unreliability. These forces are created by the high rotational speeds of the tires and the large mass that any mechanical system must include. In addition, the mass of these mechanical systems is subjected to severe shock and impulse as the tires strike various objects on the highways at high speed.

In addition, there has also been recently proposed an electromagnetic tire pressure measuring system that is attached to the tires during operation. The system consists of a pressure sensor-transponder inserted into each tire and an interrogation system operating in the kilomegahertz and gigahertz frequency band. In this high frequency band the system is subjected to a high noise level generated by reflections and eddy currents in the fenders and chassis of the vehicle. To eliminate this noise level, the interrogation system incorporates a plurality of filters in the signal receiver.

SUMMARY OF THE INVENTION

The present invention is directed to a method and apparatus for remotely measuring and monitoring the air pressure in pneumatic tires. The system includes a stationary power transmitter that generates a field of electromagnetic radiation that illuminates a remote tire pressure sensor installed inside of a tire. The pressure sensor includes a pressure transducer and a FM transmitter that are both driven by the energy radiated from the power transmitter. The pressure sensor transmits an FM signal indicating the pressure measured in the tire and this signal is received by a stationary tire pressure signal processor remotely located from the tire. The signal processor generates quantitative signals representing the pressure in the tire and displays these signals on a plurality of outputs. The pressure sensors can be located in either automobile or truck tires.

In an additional embodiment the remote tire pressure sensor is powered by magnetic field induction. A stationary magnetic field is generated by magnets located on the vehicle near the tire. When the tire is in motion, the pressure sensor cuts the field and a current is induced. The sensor transmits a tire pressure signal to a signal processor on the vehicle and the tire pressure is displayed while the vehicle is in motion.

It is an object of the present invention to provide a novel method and apparatus that overcomes the limitations and disadvantages of the prior art.

A further object of the present invention is to provide an electronic tire pressure measuring apparatus that does not require a battery for the power supply and can be located inside of a tire.

An additional object of the present invention is to provide a system that can easily and quickly measure the tire pressures in all of the tires mounted on a truck and trailer.

A further object of the present invention is to provide a tire pressure measuring system that can be installed in the driveways of the maintenance garages and fueling stations so that frequent and automatic monitoring of tire pressures can be accomplished.

An additional object of the present invention is to provide a system that can measure tire pressure while the tire is in motion so that no time is lost for routine tire monitoring.

A further object of the present invention is to provide a system that can identify and code both the tire being measured and the vehicle on which the tire is mounted so that tire data can be compiled by companies owning a plurality of vehicles.

Additional objects and features of the invention will appear from the following description in which the preferred embodiments have been set forth in detail in conjunction with the accompanying drawings.

BRIEF DESCRIPTION OF THE DRAWINGS

FIG. 2 is a diagrammatic, perspective view of the tire pressure monitoring system illustrated in FIG. 1;

FIG. 3 is a side elevational view, in section, of the remote tire pressure sensor illustrated in FIG. 1;

FIG. 10 is a diagrammatic side elevational view, partially in section of an alternative embodiment of the primary transmitting antenna of FIG. 2 illustrating an apparatus for discriminating between signals radiated from tires mounted in tandem on dual axles;

FIG. 11 is a diagrammatic plan view of an alternative embodiment of the primary transmitting antenna of FIG. 2 illustrating an apparatus for discriminating between signals radiated from adjacent tires mounted side by side on the same axle;

FIG. 12 is an end elevational view, in section, of the primary transmitting antenna and the primary receiving antenna illustrated in FIG. 2;

FIG. 13 is an end elevational view, in section, of an alternative embodiment of the primary transmitting antenna for creating a nonuniform electromagnetic field that overcomes the shielding effect of radial tires;

DESCRIPTION OF THE PREFERRED EMBODIMENTS

General Description of the Apparatus

Figure 1:
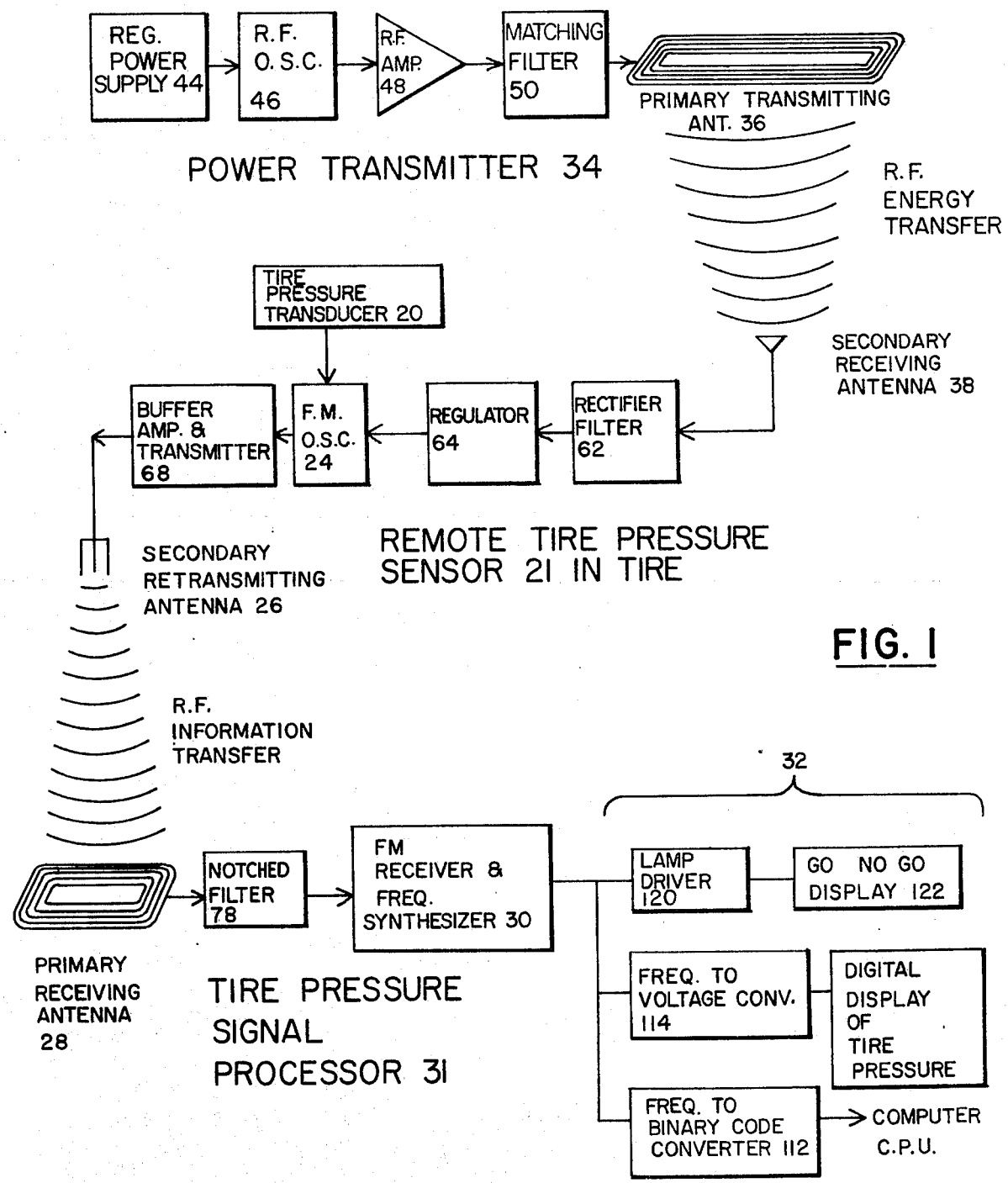
FIG. 1 is a block diagram of a tire pressure measuring system according to the present invention.

Referring to FIGS. 1, 2 and 3, a small pressure transducer 20 in the remote tire pressure sensor 21 measures the air pressure inside of a tire 22. The transducer generates a pressure signal that passes to a current controlled, frequency modulated oscillator 24 that converts the pressure signal into a frequency modulated (FM) signal. The FM signal is transmitted from a secondary retransmitting antenna 26 located in the tire to a primary receiving antenna 28 located in the roadway. The primary receiving antenna is connected to a FM receiver 30 and the tire pressure is indicated on a stationary display unit 32.

The remote tire pressure sensor 21 located in the tire is coupled to a field of electromagnetic radiation generated by a power transmitter 34 and radiated from a primary transmitting antenna 36. The pressure sensor converts this radiation into electrical power to operate itself. The primary transmitting antenna is a flat coil antenna located in the roadway and focused sharply upward. As the truck tire 22 containing the remote pressure sensor 21 rolls over the primary transmitting antenna 36, the pressure sensor is activated by the RF power field and the tire is thereby checked for adequate air pressure.

Figure 14:
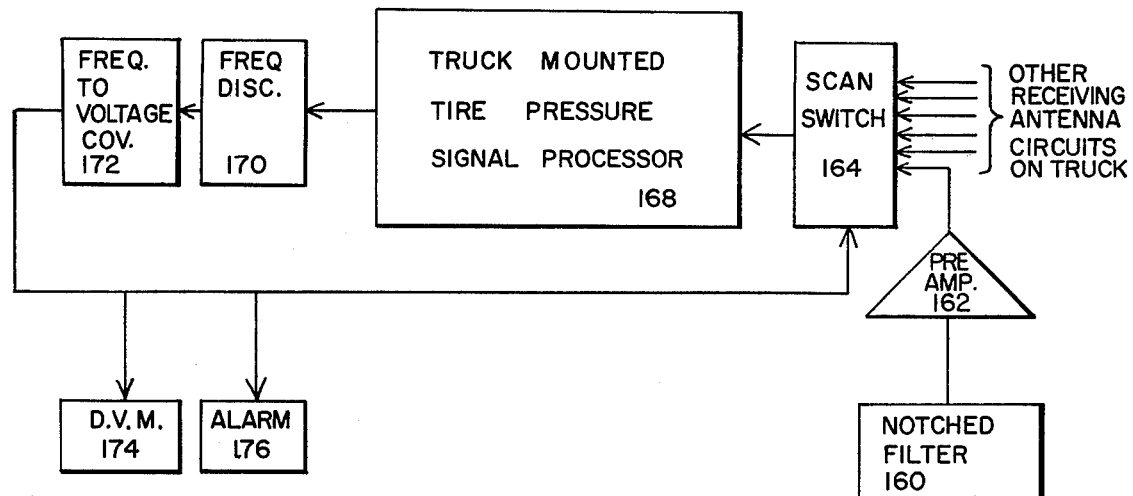
FIG. 14 is a schematic side elevational view, in section and partially cut away, of an additional embodiment of the tire pressure measuring system using magnetic field induction to energize the tire pressure sensor.
Figure 14:
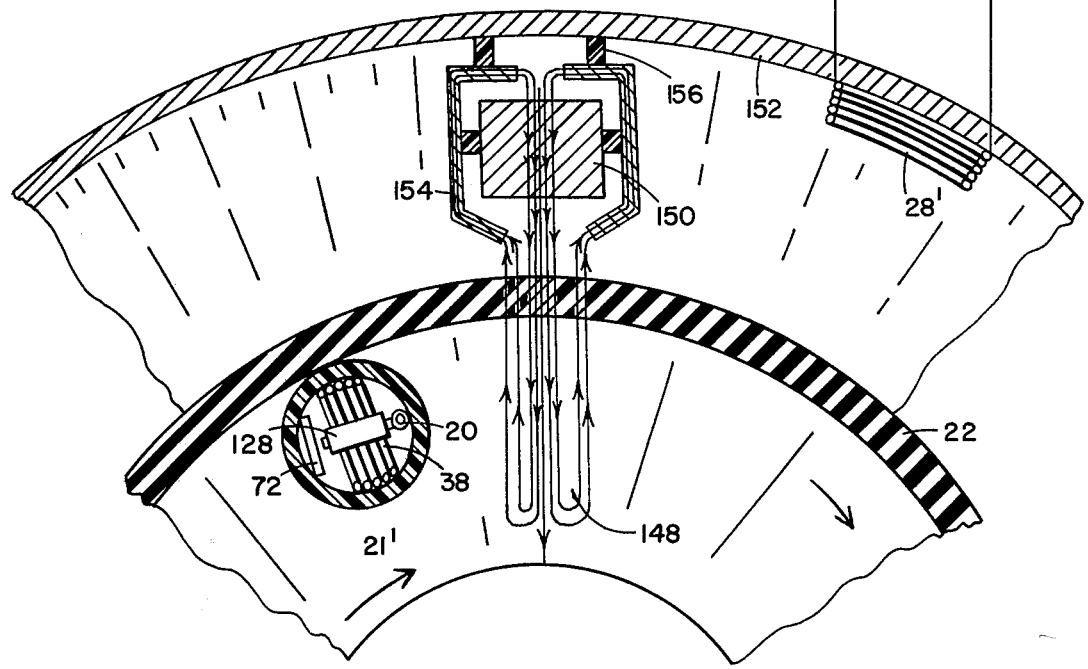

In FIG. 14 an alternative embodiment utilizes a magnetic field to induce a current for powering the tire pressure sensor 21. The pressure sensor contains a conductor 38 that is moved through the magnetic field as the tire 22 rotates. The magnetic field is generated from a magnet 150 located on the vehicle. This conductor thereby cuts the lines of magnetic flux and induces the current.

In both of the aforementioned embodiments a current inducing field is generated and the tire pressure sensor is coupled to that field. In addition, the pressure sensor includes means for converting the field into power to operate the sensor.

For the purposes of this description the tire 22 is described as being a truck tire and as forming part of a plurality of tires mounted on dual rear axels. It should be noted, however, that this invention is not limited to trucks but contemplates use on any wheeled vehicle employing pneumatic tires.

THE POWER TRANSMITTER

Figure 4:
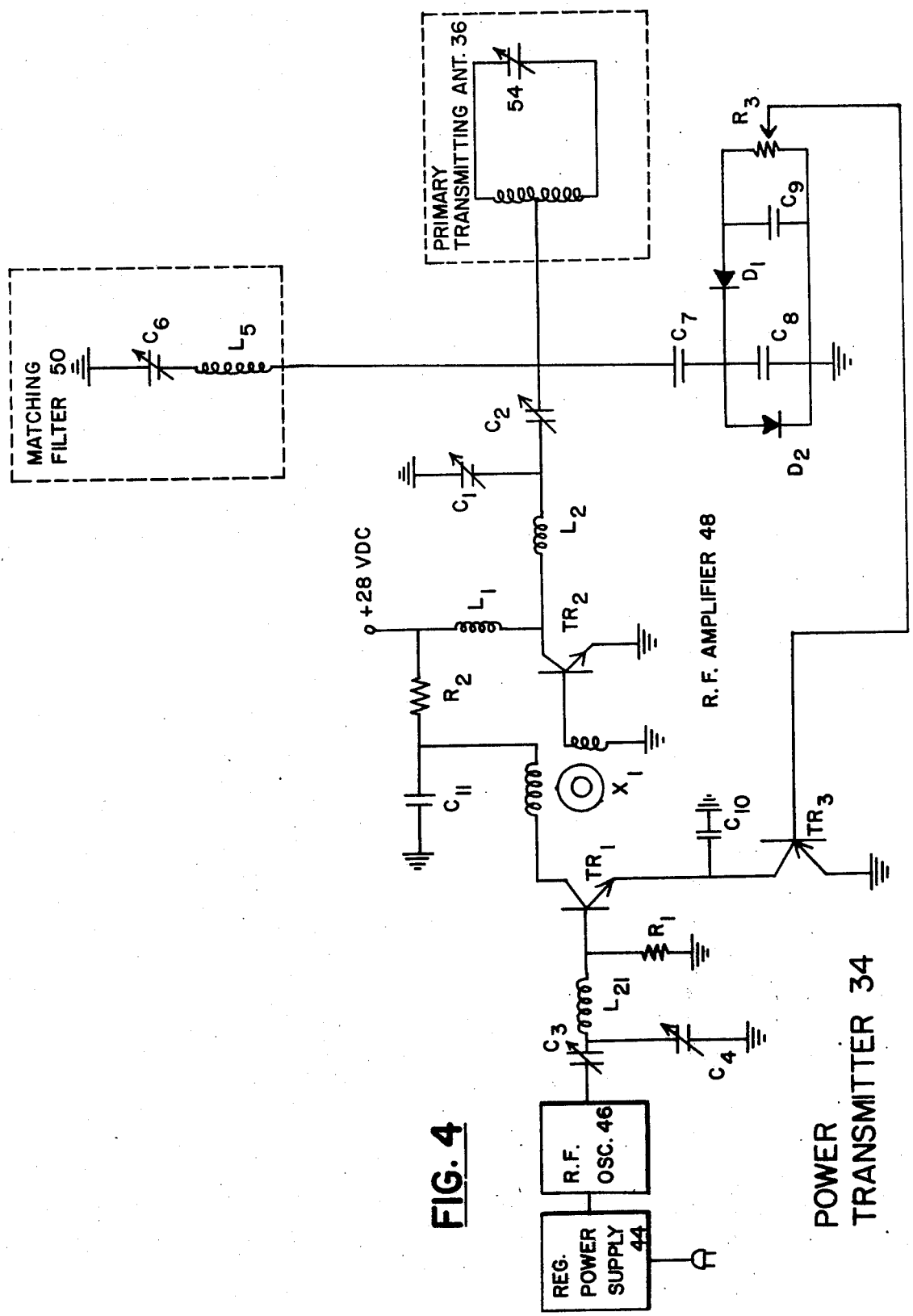
FIG. 4 is a schematic diagram of the power transmitter illustrated in FIG. 1.

Referring to FIGS. 1 and 4, the power transmitter 34 includes a conventional regulated power supply 44 that provides a constant 28 volt DC output. The regulated power supply is connected to a conventional RF oscillator 46 having a frequency range between 250 kilohertz and 30 megahertz. The RF oscillator 46 in turn is connected to a high power, Class C, RF amplifier 48. The amplifier is series tuned through a matching filter 50 to the primary transmitting antenna 36. As hereinafter described, the primary transmitting antenna is tapped to provide a 50 ohm load so that the combination of the matching filter and the tapped antenna provides a substantially noise free RF output signal.

More specifically, the RF oscillator 46 is coupled to the RF amplifier 48 through capacitors C3, C4 and inductor L21. The first stage of amplification of the signal from the RF oscillator 46 is transistor TR1. The output of transistor TR1 is connected through a transformer X1 to second transistor TR2. Inductors L1 and L2 form a voltage divider. A feedback loop is formed by inductor L1, resistor R2 and one of the windings of the transformer X1. The feedback loop is used to maintain a proper signal level for the input to transistor TR2 from transistor TR1. The capacitors, C1, C2 form an adjustable, frequency independent, voltage divider. The bias on transistor TR1 is set by an automatic line control (ALC) detector comprising diodes D1, D2, capacitors C7, C8, and C9 and resistor R3. The DC signal picked off of resistor R3 passes to transistor TR3 which in turn sets the bias level on transistor TR1. The matching filter 50 includes an inductor L5 and a capacitor C6 that form the series tuned circuit.

In operation, the AC output signal from the RF oscillator 46 passes through inductor L21 and is amplified by transistor TR1. This incoming signal is in Class B operation. The output of transistor TR1 passes through transformer X1 and is amplified by transistor TR2. Transistor TR2 operates in Class C. The output of transistor TR2 is adjusted by inductors L1, L2 so that Class C operation is always maintained through the feedback loop that includes the winding in transformer X1. The matching filter 50 in combination with the tapped primary transmitting antenna 36 maintains the sine wave shape of the transmitted RF radiation. Part of the output from the matching filter 50 is tapped off and used to control the bias level of transistor TR1 through the ALC detector.

In one embodiment that was actually constructed, a Lambda regulated power supply was used to deliver 150 watts of power at 28 volts DC. A Hewlett Packard 606B RF oscillator connected to the regulated power supply provided a 3 volt AC output at 300 kilohertz, and the RF amplifier 48 delivered 150 watts into the tapped 50 ohm primary transmitting antenna 36.

THE PRIMARY TRANSMITTING ANTENNA

Referring to FIGS. 2, 4, and 12, the primary transmitting antenna 36 is a parallel tuned LC circuit that includes a high voltage capacitor 54 connected to a flat coil antenna 56. The antenna is supported by a plurality of spacers 58 located so that the windings of the coil are spaced apart at equal distances. In the embodiment that was actually constructed the antenna had a resonant frequency of 300 kilohertz and an impedance of 50 ohms to match the output impedance of the RF amplifier 48. The high voltage capacitor 54 was a vacuum type capacitor having a capacity of 100 picofarads. The flat coil antenna had twenty-nine turns of one hundred and twenty strand, number thirty-six, type two, double nylon insulated Litz wire. The flat coil was exactly six feet long and eleven and one half inches wide over all. Each segment of twenty-nine windings was 3.182±0.036 inches wide and each winding was spaced apart by 0.087±0.002 inches.

The output of the primary transmitting antenna 36 is an electromagnetic wave upwardly directed from the roadway. This wave creates an R.F. energy field that illuminates the tire 22 as it passes over the antenna. The tire pressure sensor 21, hereinafter described, in the tire is coupled to the field and converts the radiation into power used to operate itself. In other words, the R.F. field is the means by which energy is transferred to the remote tire pressure sensor located inside of the tire.

THE REMOTE TIRE PRESSURE SENSOR

Figure 5:
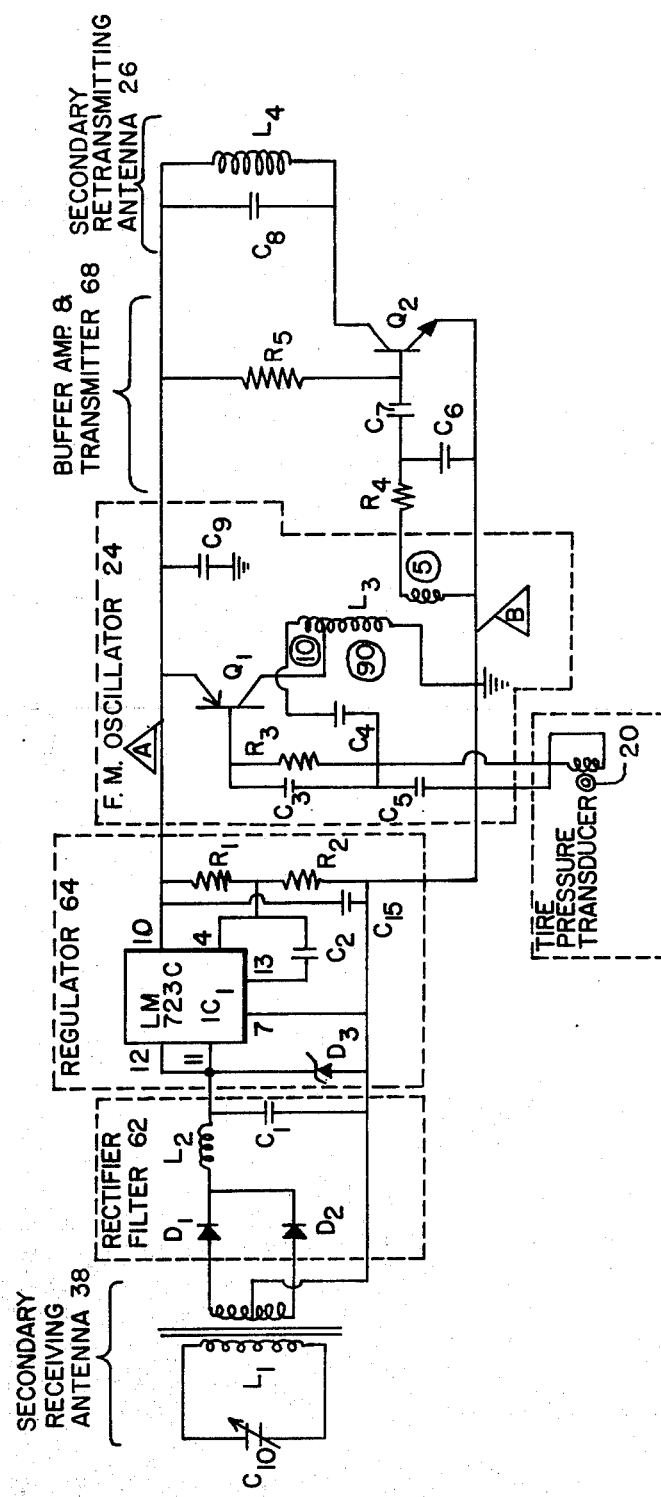
FIG. 5 is a schematic diagram of the remote tire pressure sensor illustrated in FIG. 1.

Referring to FIGS. 3 and 5, the electromagnetic radiation generated from the power transmitter 34 is received by the secondary receiving antenna 38. This radiation is converted into electrical power for operating the pressure sensor. The secondary receiving antenna is a parallel tuned LC circuit comprising an inductor L1 and capacitor C10. The signal from the receiving antenna passes through a rectifier-filter 62 having diodes D1, D2 that form a full wave rectifier and a LC filter L2, C1. The output of the rectifier-filter is connected to a regulator 64 that includes a Fairchild type LM723C IC1 referenced against a Zeiner diode D3. The regulator is connected through a resistive network R1, R2 so that between reference points A and B of FIG. 5 sufficient voltage is produced to operate the FM oscillator 24.

It should be noted that the conversion of electromagnetic radiation into electrical power provides the total power requirements of the pressure sensor. The sensor does not use a battery and has no external physical connections outside of the tire.

The air pressure within the tire 22 is measured by a small pressure transducer 20. In the embodiment that was constructed, the transducer was a small ferrite toroid having an outer diameter of 50 mils, an inner diameter of 30 mils and a thickness of 18 mils. In order to be highly magnetostrictive, the transducer was fabricated from nickle ferrite. The toroid was wound with seventeen turns of wire and operated in essence, like a linear reluctance transducer. Such a transducer changes its inductance in response to an increase or a decrease in the absolute pressure on the toroid and is not required to be referenced against atmospheric pressure.

The output of the regulator 64 is connected to an FM oscillator 24 that includes a transistor Q1 and a coil L3 tapped to form a 10:90 turns ratio transformer. The transistor Q1 is a current source that feeds a transformer-type oscillator circuit comprised of an inductor L1, a capacitor C5 and the pressure transducer 20. Capacitor C3 and resistor R3 control the bias of the transistor Q1. When the absolute pressure in the tire changes, the transducer correspondingly changes its reluctance. This change in reluctance is reflected back into the FM oscillator circuit 24 and the output frequency of the circuit changes. A magnetic buffer effect is created that maintains the total current through the transistor Q1.

It should be noted that oscillation in the FM oscillator circuit and the resulting change in output frequency is the result of the amount of current passing through the pressure transducer 20. Thus, the pressure transducer is a current controlled, magnetostrictive element operating in an oscillator circuit.

The output signal from the FM oscillator 24 passes to a buffer amplifier and transmitter 68 through a five turn buffer input coil on the transformer L3. Capacitors C6, C7 are used to couple the input coil to the oscillator so that the reflective impedance from the buffer amplifier to the FM oscillator is minimized. Resistor R4 is used to minimize the current drain into the buffer amplifier. The FM signal is amplified by transistor Q2 and radiated by the secondary retransmitting antenna 26. The retransmitting antenna is a parallel tuned LC circuit. The output signal from the remote tire pressure sensor is, thus, a frequency modulated RF radiation that increases in frequency as the pressure in the tire increases.

It should be noted that the buffer amplifier 68 is located between the secondary retransmitting antenna 26 and the FM oscillator 24. The buffer amplifier prevents stray radiation from being picked up by the retransmitting antenna and fed back into the oscillator circuit. Without the buffer amplifier this stray radiation would cause the FM oscillator to change its frequency and thereby transmit spurious output signals.

In the embodiment that was actually constructed the pressure transducer 20 was prestressed to obtain a bias level and the pressure sensor transmitted a 450 kilohertz signal when the tire pressure was 80 PSIG. The pressure transducer had a sensitivity of approximately 100 hertz per 1 PSI change in tire pressure so that a 10 PSI change in tire pressure shifted the output frequency of the pressure sensor by 1 kilohertz.

The remote tire pressure sensor further includes a dwell angle control network that provides power to the pressure sensor 21 after the sensor has left the RF energy field of the primary transmitting antenna 36. Capacitor C1 in the rectifier filter 62 and capacitor C2 in the regulator 64 have an increased size in order to allow energy storage in the circuit. Capacitor C15 has also been added to permit energy storage within the regulator 64. In the embodiment that was constructed C1 has a capacity of 0.33 microfarads, C2 has a capacity of 1000 picofarads, and C15 3,000 picofarads.

In operation, the dwell angle control network stores energy while the pressure sensor is within the RF energy field. Capacitors C1, C2 and C15 are charged in the energy field to twice the normal operating voltage. Thereafter, when the pressure sensor leaves the high energy field, these capacitors discharge in such fashion as to power the FM oscillator 24. In the embodiment that was actually constructed the dwell angle network stored sufficient RF energy to increase the operating period of the sensor from twenty-two and a half degrees of tire rotation to thirty-five degrees of tire rotation.

Referring to FIG. 3, the remote tire pressure sensor 21 is encapsulated by a suitable elastomeric compound and is bonded to the wall of the tire 22. In the preferred embodiment the pressure sensor is located in the center of the tire directly over the middle of the tire tread. The pressure transducer 20 records the pressure in the tire through a thin diaphragm 70 that is exposed to the interior of the tire. The entire electronic circuit is placed on a semiconductor body or wafer and is surrounded by the secondary receiving antenna 38. Directly below the wafer are the secondary retransmitting antenna 26 and the antenna capacitors 72.

THE TIRE PRESSURE SIGNAL PROCESSOR

The FM signal transmitted from the remote tire pressure sensor 21 in the tire 22 is received by the primary receiving antenna 28 located in the roadway. Referring to FIG. 2, the axis of primary receiving antenna is oriented at 90° with respect to the axis of the primary transmitting antenna 36. These antennas are located perpendicularly with respect to each other in order to minimize the interference between the high energy transmitting field of the primary transmitting antenna 36 and the low power receiving field of the primary receiving antenna 28. In the embodiment that was constructed the receiving antenna had a length of six feet and contained eight turns of Litz wire.

Figure 6:
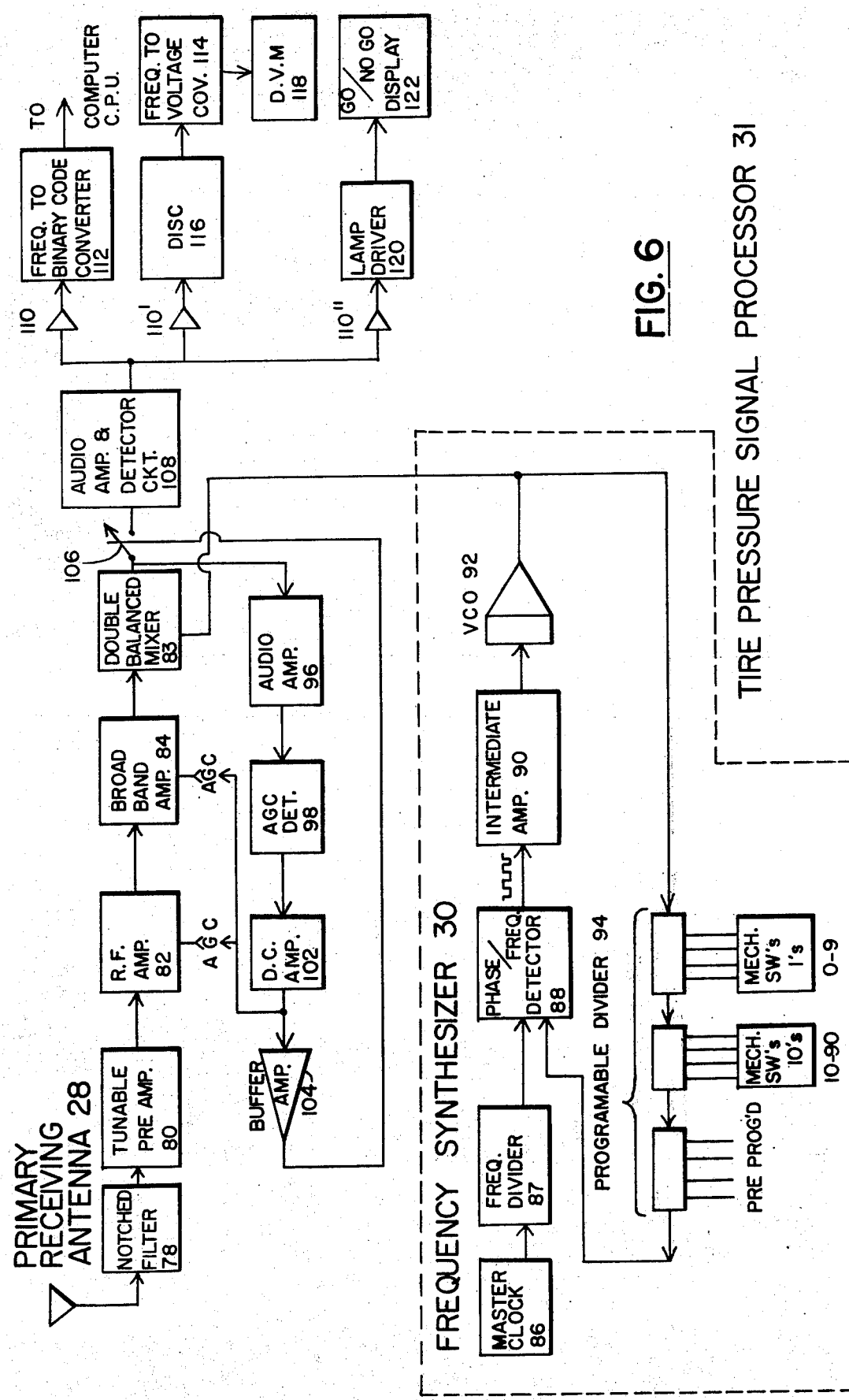
FIG. 6 is a block diagram of the tire pressure signal processor illustrated in FIG. 1.

Referring to FIGS. 1 and 6, the primary receiving antenna 28 is connected to a notched filter 78. The notched filter is a parallel T rejection filter that minimizes the transfer of energy from the primary transmitting antenna 36 to the signal processor. After passing through the notched filter 78, the FM signal from the pressure sensor 21 passes through a tunable preamplifier 80. The tunable preamplifier is analogous to an LC antenna filter and defines the operating bandwidth of the signal processor. The output from the tunable preamplifier 80 is passed to a RF amplifier 82 and thereafter to a broad band amplifier 84. The broad band amplifier controls the gain of the entire signal processor. After amplification, the signal from the broad band amplifier passes to a double balanced mixer 83. The double balanced mixer also receives a signal from a voltage control oscillator (VCO) 92 in the frequency synthesizer 30 hereinafter described.

The frequency synthesizer 30 comprises a master clock 86 which was a crystal controlled oscillator operating at 100 kilohertz in the embodiment that was actually constructed. The output of the master clock is connected to a step down frequency divider 87. In the embodiment that was constructed the frequency divider stepped the master clock frequency down to one kilohertz. The signal is thereafter passed to a phase and frequency detector 88 that has an output in the form of a pulse train. The phase and frequency detector is connected to an intermediate amplifier 90 whereinn the pulses are amplified and integrated. The phase and frequency detector is connected to an intermediate amplifier 90 wherein the output of the intermediate amplifier is a variable DC level that controls a voltage control oscillator (VCO) 92. The output of the voltage control oscillator is connected to both the double balanced mixer 83 and a three stage, preprogrammable dividing network 94. Each stage of the preprogrammable divider selectively steps down the frequency of the input from the VCO by factor selectable between one and ten. Thus, the first stage can reduce the VCO frequency from 1 to 9, the second stage from 10 to 90 and the last stage from 100 to 900. The output from the three stage preprogrammable divider is an AC signal that is passed to the phase and frequency detector 88. THe programmable divider permits the output of the voltage control oscillator 92 to be accurately selected so that the frequency of the signal fed back to the double balanced mixer 83 is of high precision.

To avoid saturation of the broad band amplifier 84, an automatic gain control circuit is used. The output of the double balanced mixer 83 is connected in turn to an audio amplifier and an automatic gain control detector 98. The audio amplifier provides the volume control for the tire pressure signal processor and the automatic gain control detector serves as a DC amplifier. The output of the automatic gain control detector 98 is connected to an automatic gain control DC amplifier 102. The feedback loop is completed by passing the output of the DC amplifier 102 to the RF amplifier 82 and the broadband amplifier 84.

The output of the automatic gain control DC amplifier 102 is also used to prevent spurious signals from being indicated on the display unit 122 and the digital voltmeter 118. The output of the DC amplifier is connected to a buffer amplifier 104 that is in turn connected to a cutout switch 106. The cutout switch is used to cut in both the audio amplifier 108 and the display unit 32 whenever the signal received from a remote pressure sensor 21 reaches a predetermined signal level.

From the cutout switch 106, the signal passes through the audio amplifier 108 to four buffer amplifiers 110 connected in parallel. The first buffer amplifier 110 is connected to a conventional frequency to binary code converter 112. The output of the frequency to binary code converter is connected to either a central processing unit (CPU) or a computer memory. This output permits storage and retrival of the data measured by the remote tire pressure monitoring system. The second buffer amplifier 110' is connected in turn to a frequency discriminator 116 and a frequency to voltage converter 114 that changes the frequency of the tire pressure signal into a DC voltage level. The DC voltage level is measured by a digital volt meter 118 located on the display unit 32 (FIG. 2). Thus, the digital volt meter visually displays the magnitude of the air pressure in the tire measured by the remote pressure sensor 21. The third buffer amplifier 110" is connected to a conventional lamp driver 120 that is in turn connected to a pair of go/no-go lights 122 located on the face of the display unit 32. The go/no-go lights indicate either that the tire is properly inflated to a pressure above a predetermined value or that the tire is underinflated to a pressure below the predetermined value. In the embodiment was constructed a green light indicated that the air pressure in the tire being measured was above 60 PSIG and a red light indicated that the pressure was below 58 PSIG.

ALTERNATIVE EMBODIMENTS OF THE REMOTE TIRE PRESSURE SENSOR

Figure 9:
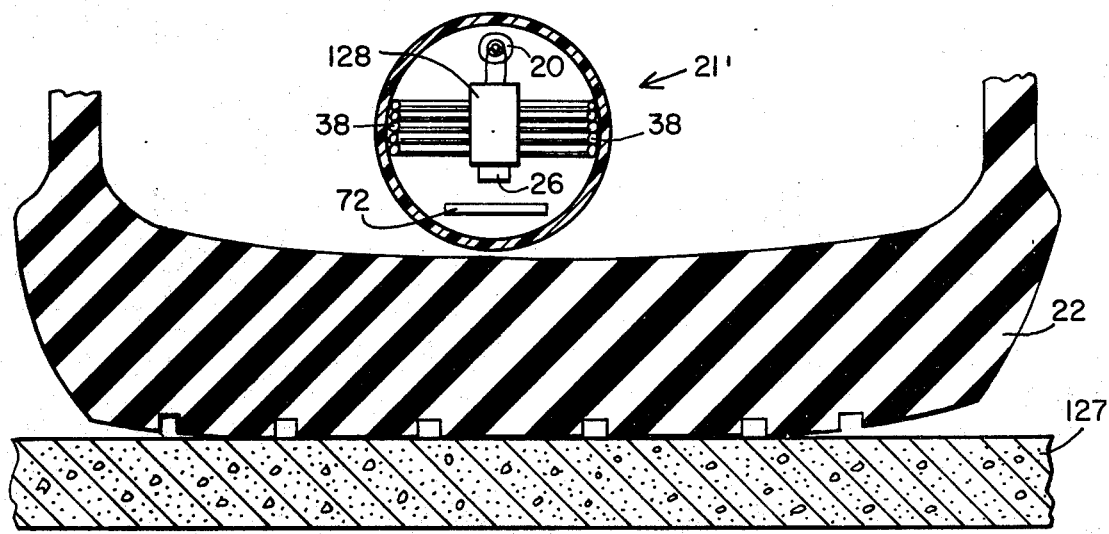
FIG. 9 is a side elevational view, in section, of a third alternative embodiment of the remote tire pressure sensor of FIG. 3, this embodiment being a free rolling sphere located inside of the tire.

Referring to FIG. 9, the remote tire presssure sensor 21' is formed in the shape of a sphere and can be introduced inside of the tire 22 as a free rolling element. The sensor 21' includes a secondary receiving antenna 38 that is circumferentially wound around the surface of the sphere. Also located within the sphere are the secondary retransmitting antenna 26 and the associated antenna capacitors 72. As hereinbefore described, the pressure transducer 20 measures the air pressure inside of the tire and the signals are processed in a circuit located on a semiconductor body 128.

At low speed the sphere rolls freely within the tire, but at high speed the centrifugal force exerted on the sphere presses the sphere against the tire and eliminates the relative motion between the sphere and the tire. Whenever the tire pressure is measured, either the tire is stationary and the sphere is on the bottom of the inner wall of the tire or the tire is rotating at low speed and the sphere is rolling along the bottom of the inner wall of the tire. In either case the pressure sensor is located in close proximity to the primary transmitting and receiving antennas 36, 28 in the roadway and the transmission efficiency of energy and information is maximized.

Figure 8:
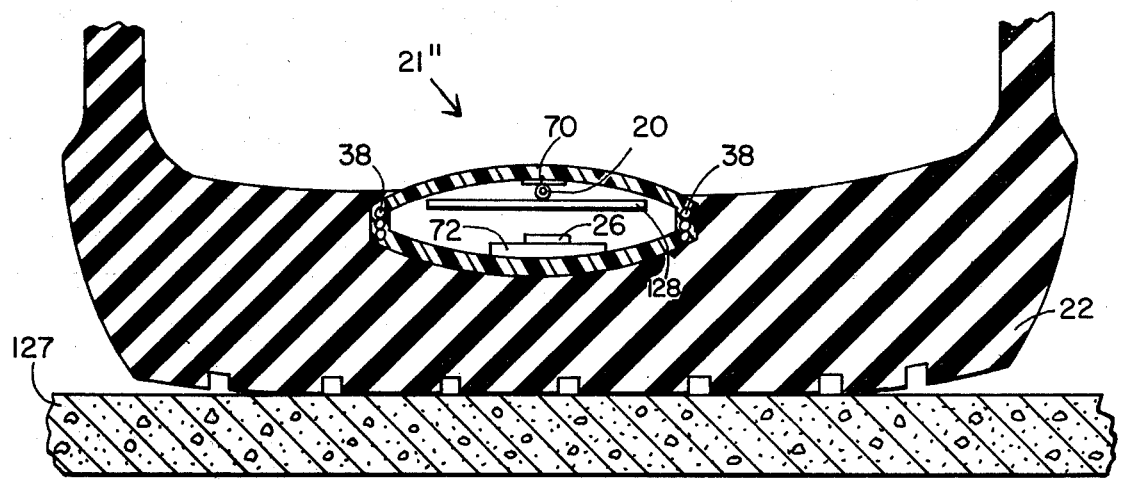
FIG. 8 is a side elevational view, in section, of a second alternative embodiment of the remote tire pressure sensor of FIG. 3 located in the casing of the tire near the center of the tread.

Referring to FIG. 8, the remote tire pressure sensor 21″ is miniaturized and embedded within the casing of the tire 22 during manufacture. The air pressure in the tire is measured by the transducer 20 that senses the air pressure through a thin diaphragm 70. The electronic elements of the sensor are located on a semiconductor body 128 and the secondary receiving antenna 38 is wound around the circumference of the sensor. The locations of the secondary retransmitting antenna and the associated antenna capacitors are indicated by reference numerals 26, 72 respectively. The construction and operation of the pressure sensor 21″ embedded within the tire casing is similar in all respects to the sensors hereinbefore described.

Figure 7:
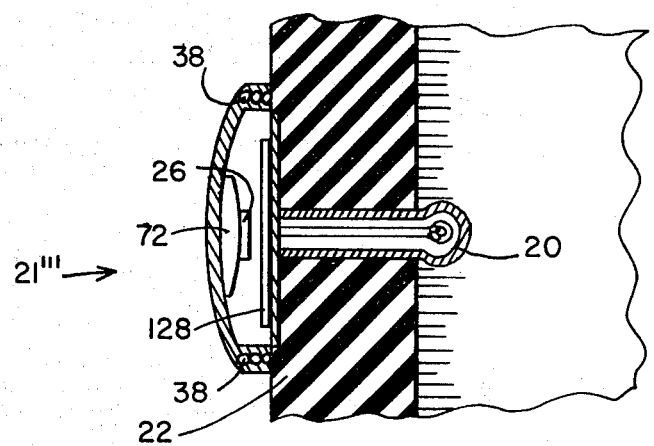
FIG. 7 is a side elevational view, in section, of a first alternative embodiment of the remote tire pressure sensor of FIG. 3 extending through the sidewall of a tire.

Referring to FIG. 7, the tire pressure sensor 21‴ is corporated into a repair plug inserted into the sidewall of the tire 22. The repair-plug-type pressuree sensor includes a transducer 20 located in the free end of an elongate shaft and communicating with the interior of the tire. As hereinbefore described, the circuit on the semiconductor body 28, the secondary antennas 26, 38 and the antenna capacitors 72 comprise the pressure sensor. The repair-plug-type sensor can be inserted into the sidewall with a conventional pneumatic gun, and the tire need not be dismounted. The construction and operation of the repair plug sensor 21‴ is similar in all respects to the sensors hereinbefore described

SIGNAL AMBIGUITIES AND ANTENNA CONFIGURATIONS

When the remote tire pressure monitoring system is used on vehicles having multiple wheels and axles, the system generates signal ambiguities. The aforedescribed system with a single primary transmitting antenna 36 and a single primary receiving antenna 28 is unable to distinguish between the signals coming from two pressure sensors mounted in two tires that are following the same path and spaced apart by only a short distance. Referring to FIG. 10, the first type of signal ambiguity occurs when the signals from each sensor occur simultaneously. The second type of ambiguity occurs when the trailing tire 22′ transmits a signal to the processor 31 before the leading tire 22 transmits its signal to the receiving antenna 28. In both cases if the signals are not coded, the signal processor can not identify the origin of the signal.

FIG. 10 illustrates the path of a point P1 located either on the sidewall of the tire 22 or on the inner wall of the casing. The path of the point describes a prolate trochoid curve:

$$x = b\phi - \sin\phi \quad (1)$$

$$y = a(1 - \cos\phi) \quad (2)$$

where $a$ is the radial distance from the center of the tire to $P_1$ or the origin of the coordinate system and $b$ is the radius of the tire. Signals are radiated along the path when each sensor is at a minimum distance from the roadway.

It should be noted that if the pressure sensor is rigidly attached to the tire and rotates therewith without relative motion, then the angular location of the sensor at any time with respect to the center of the tire is uniformly randomly distributed. Thus, the probability that the wheel will be over or proximate to any specific point on the pavement at any time is also uniformly randomly distributed.

To eliminate the ambiguity created by simultaneously occuring signals originating from tires mounted in tandem, the primary transmitting antenna 36 and the primary receiving antenna 28 are segmented into a plurality of antenna segments so that the length of each segment is less than the spacing between the two axels. Assuming that each antenna segment is equal in size and that the shape and length of each segment is greater than the circumference of the tire by up to 25%, the following constraints describe the optimum antenna system:

$$B \max \leq 2\, C \min - L \max \quad (3)$$

$$B \min \geq C \max + L \max \quad (4)$$

$$B + A \geq 2\, C \max \quad (5)$$

where, $A$ is the length of each antenna segment; $B$ is the distance from the leading edge of one antenna segment to the next leading edge of the succeeding antenna segment; $C$ is the circumference of the tire; and $L$ is the spacing between the axles.

The optimum solution to Equations 3–5 and the preferred embodiment for trucks having conventional sized dual axles is an antenna comprising seven equal sized segments with each antenna segment being 77 inches long (A + 77 inches) and having a spacing between each segment of 42 inches (B = 194 inches).

To eliminate the second ambiguity occuring when the trailing tire 22′ transmits a signal before the leading tire 22 transmits its signal, a time-based discrimination logic circuit is used. This circuit operates on the time differential that the two tires have when crossing the threshold to the segmented antenna.

To identify which pressure sensor is transmitting a signal when there are two pressure sensors mounted in two tires side by side on the same axle, two separate parallel spaced apart antenna arrays are used. In FIG. 11 the two arrays A, B comprising the antenna segments A1–A7, B1–B7 are constructed to each have a very sharp, upwardly directed radiation pattern. Each of the antenna segments is a flat coil antenna constructed in the manner hereinbefore described. The radiation pattern operates so that the pressure sensors only respond to radiation coming from the underlying antenna array and not from an adjacent array. Thus, the antenna array comprising the segments A1–A7 receives the two signals transmitted from the two outer tires 22, 22′, and the corresponding array having the segments B1–B7 receives the two signals from the two inner tires 22″ and 22‴. The lateral spacing between the two arrays is equal to the spacing between the inner and outer tires on each of the axles.

METAL BELTED TIRES

By changing the configuration of the antennas, the remote tire pressure monitor can measure the air pressure within a steel or metal belted radial tire. Radial tires usually have a plurality of circumferentially disposed steel bands that create an electrical RF shield around the tire. The blocking effect of this electrical shield can be overcome, however, by rotating the secondary receiving antenna 38 in the pressure sensor by ninety degrees. In this position the antenna 38 is sensitive to the magnetic vector component of the radiation from the primary transmitting antenna 36 hereinbefore described. Although in an electromagnetic field the magnetic vector is usually much weaker than the electrical vector, in the present invention the pressure sensor is operating so close to the primary transmitting antenna that there is sufficient energy obtainable from the magnetic vector.

In addition, the electrical shield created by radial tires can be overcome by reforming the RF energy field created by the primary transmsitting antenna 36. In FIG. 12 the flat coil antenna 56 used for conventional tires is formed by a plurality of uniformly spaced apart turns of wire. In contrast, the flat coil antenna 56' (FIG. 13) is formed by turns of wire each having an increased lateral spacing as the distance from the center of the antenna increases. This nonlinear spacing of the antenna wire creates a nonuniform field with a slant angle and the electrical field generated thereby bends around the steel bands within the tire.

PRESSURE SENSOR CODING

The remote tire pressure monitoring system is also capable of distinguishing between the various vehicles that pass over the system. Since the system is capable of operating over a wide frequency spectrum, discrete operating bands within this spectrum can be allocated among the public and private carriers using the system. Each trucking company can be assigned to an operating band and all of the pressure sensors mounted on its trucks can then transmit tire pressure signals in this band. By using a plurality of band pass filters and discriminators in the signal processor, the system can classify the transmitted signals into the assigned operating bands and thereby distinguish between the trucking companies.

By way of example, a tire monitoring system can be located on a highway at a point remote from the dispatch headquarters of a trucking company. Whenever a company truck passes across the monitoring system, a coded signal indicating the occurrence can be transmitted by conventional means to the dispatch headquarters of the trucking company. Receipt of this coded signal enables the dispatcher to ascertain th location of the company truck and to predict the arrival time of the truck at the dispatch headquarters. As a consequence, vehicle operators are no longer required to stop and to telephone ahead to the dispatch headquarters two hours prior to arrival. The truck itself transmits a signal to the dispatch center identifying its passage across a threshold located two hours away.

In like manner the pressure sensors can also be individually coded to indicate which tire on each truck is being measured. As hereinbefore described, this individual coding can be accomplished by frequency band allocation. In other words, each tire on each truck can transmit a coded signal identifying the tire, the trucking company and the pressure in the tire. This information can be used for collecting data on tire wear and longevity and can be stored in a digital computer connected to the frequency to binary code converter 112 (FIG. 1).

TIRE PRESSURE SENSOR POWERED BY MAGNETIC FIELD INDUCTION

FIG. 14 illustrates a system for powering the remote tire pressure sensor 21' by magnetic field induction. When the pressure sensor moves through a magnetic field 148, an induced current is generated therein that powers the sensor. More specifically, reference numeral 150 indicates a magnet rigidly mounted to the under surface of the fender 152 on the vehicle. In the preferred embodiment this magnet is a YAG permanent magnet having a field strength of between 100 to 150 gauss. However, it is comtemplated that either an electromagnet or a self-focusing permanent magnet can also be used to generate the magnetic field 148. The magnet 150 is surrounded by two focusing elements 154 that are made from a magnetically permeable material such as copper or bronze. The focusing elements are also positioned to form an air gap 156 adjacent to the fender 152 so that the fender does not become part of the magnetic circuit. The focusing elements direct the magnetic field into a concentrated, substantially cylindrical envelope that penetrates through the casing of the tire 22.

As hereinbefore described, when the tire 22 is traveling at high speed, the remote tire pressure sensor 21' moves with the tire 22 without any relative motion. As a consequence the sensor is moved through the magnetic field during each rotation of the tire and the conductor 38 in the secondary receiving antenna cuts through the magnetic lines of flux. When the lines of magnetic flux are cut by the moving conductor, a voltage is generated across the conductor and a current is induced therein. This voltage appears across the input to the rectifier filter 62 (FIG. 5). In its effect on the pressure sensor, the magnetic field induced by the electromagnetic radiation from the power transmitter 34 (FIG. 1) hereinbefore described. In both cases the pressure sensor is powered by a current inducing field.

The remote tire pressure sensor 21' in this embodiment is constructed and operates in the same manner as the pressure sensors 21-21'" hereinbefore described. In each pressure sensor the conductor or windings in the secondary receiving antenna 38 (FIG. 1) cut the lines of magnetic flux and induce a current. Thus, for the purposes of brevity, a description of the sensor at this point need not be repeated. However, it should be noted that the rectifier filter 62 (FIG. 5) acts as a commutator and thereby overcomes the counter currents induced from the opposing magnetic flux lines.

Located on the under surface of the fender 152 beyond the magnet 150 in the direction of tire rotation is the primary receiving antenna 28'. The primary receiving antenna is a conventional coil type antenna rigidly mounted to the fender 152 of the vehicle. In the embodiment that was constructed the primary receiving antenna was fabricated from twenty-eight turns of Litz wire coiled in a rectangle fifteen inches long and four inches wide. The receiving antenna was located fifteen degrees ahead of the magnet so that the pressure sensor 21' was charged up immediately before radiating a pressure signal to the antenna.

The primary receiving antenna 28' is connected to a notched filter 160 that reduces the background and R.F. noise picked up by the receiving antenna. The output from the notched filter is connected to a tunable preamplifier 162 that is analogous to an LC antenna filter and defines the operating band width of the system. The output from the tunable preamplifier is passed to a scan switch 164 that sequentially and periodically scans the outputs from a plurality of corresponding tunable preamplifiers. These other preamplifiers are connected to similar receiving antennas located on the other fenders of the vehicle. There is a magnet, a pressure sensor, and receiving antenna installed for each tire on the vehicle, and the scan switch periodically samples the pressure signal from each tire.

The output of the scan switch 164 is connected to a tire pressure signal processor 168 that is mounted on the vehicle. The signal processor 168 is a frequency synthesizer-type radio receiver of the kind described hereinbefore in connection with FIG. 6. The construction and operation of the truck mounted signal processor 168 is similar in all respects to the signal processor 31 and for the purposes of brevity, need not be described further.

The output of the tire pressure signal processor 168 is connected in turn to a frequency discriminator 170 and to a frequency to voltage converter 172 that changes the frequency of the tire pressure signal into a DC voltage level. The DC voltage level obtained from the frequency to voltage converter is measured by a digital volt meter (DVM) 174 located on the dashboard (not shown) in the cab of the vehicle. The digital voltmeter visually displays to the operator of the vehicle the magnitude of the air pressure measured in the tire. The output of the frequency to voltage converter 172 is also used to trigger an alarm 176 on the dashboard so that the operator is audibly warned of a dangerously low tire pressure.

The output from the frequency to voltage converter 172 is also fed back to the scan switch 164. Each pressure signal that is above a minimum threshold value is used to step the switch to the next preamplifier output. If all of the tire pressures on the vehicle are proper, the output from the frequency to voltageconverter 172 steps the scan switch continuously from output to output. On the other hand, if one tire on the vehicle has a dangerously low pressure, the output from the frequency to voltage converter 172 is insufficient to step the scan switch beyond that indicating the dangerously low pressure, and the low pressure remains visibly displayed on the digital volt meter 174 to the operator of the vehicle.

Figure 15:
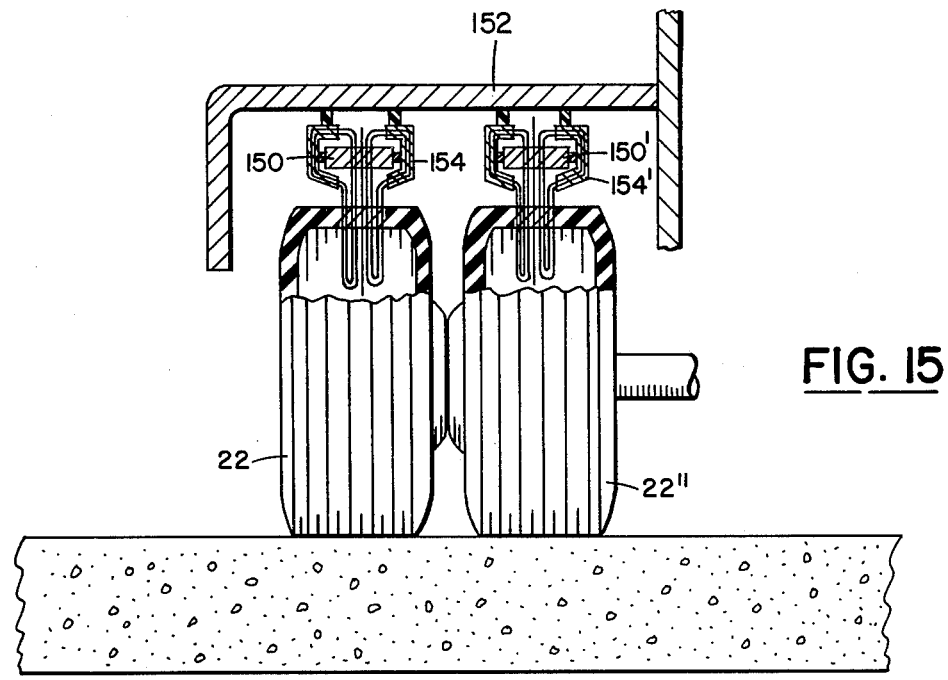
FIG. 15 is an end elevational view, in section and partially cut away, of the tire pressure measuring system of FIG. 14 illustrating two magnetic fields focused on two tires mounted side by side.

Referring to FIG. 15, when two tires 22, 22" are mounted side by side on the same axle, the focusing elements 154, 154' are used to direct the magnetic field 148 from each magnet into a concentrated envelope that penetrates only the closer tire. The focusing elements thereby eliminate cross talk between the tires and help to reduce the noise from induced electromagnetic radiation.

Figure 16:
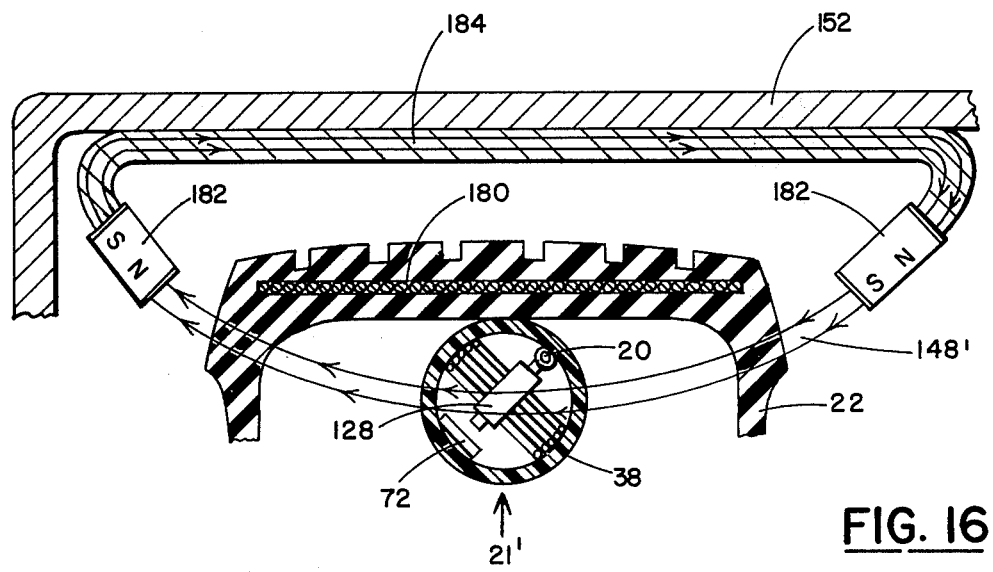
FIG. 16 is an end elevational view, in section and partially cut away, of the magnetic field induction tire pressure measuring system illustrating a magnetic field that overcomes the shielding effect of radial tires.

Referring to FIG. 16, a magnetic field can also be used to measure the air pressure within steel or metal belted radial tires. Most of the radial tires produced today do not contain metals with high permeability, and as such they can be easily energized with the single magnet 150 (FIG. 14). However, a few tires contain steels having nickel, and these tires shield the tire pressure sensor 21 from a penetrating magnetic field.

To overcome the effect of a magnetically permeable metal belt 180, two permanent magnets 182 are placed in opposing relationship on the under surface of the fender 152. The magnetic field 148' generated therefrom is directed down, below, and around the metal belt 180 and into the path of the pressure sensor 21' as it rotates with tire. The permanent magnets 182 are connected together by a yoke 184 that is fabricated from a magnetically permeable material such as copper or bronze.

In operation, the remote tire pressure sensor 21' in FIG. 14 rotates in the tire 22 with no relative motion therebetween. A magnetic field 148 is formed in a focused, concentrated envelope by the magnet 150 and the focusing elements 154 attached to the under surface of the fender 152. When the pressure sensor cuts through the lines of magnetic flux, the conductor 38 in the secondary receiving antenna induces a current at the input to the rectifier filter 62 (FIG. 5). This current is sufficient to operate the remote tire pressure sensor in the manner hereinbefore described in connection with FIG. 5. The pressure sensor radiates an FM pressure signal to the primary receiving antenna 28' mounted on the fender beyond the magnet 150. The tire pressures measured by each tire on the vehicle are selectively sampled by the scan switch 164 and displayed to the operator by the digital volt meter 174. If one tire on the vehicle has an inadequate tire pressure, the scan switch stops, the digital volt meter indicates to the operator the low pressure, and the alarm 176 audibly warns him of the condition.

Although the foregoing description of the preferred embodiments discloses the use of a FM transmitter in the remote pressure sensor, it should be understood tha the system operates equally well with an AM transmitter and its associated receiving and processing equipment. Thus, although the best mode contemplated for carrying out the present invention has been herein shown and described, it will be apparent that modification and variation may be made without departing from what is regarded to be the subject matter of the invention.

We claim:

1. Apparatus for remotely measuring the pressure in a pneumatic tire, comprising:
   a. means for generating a current inducing field;
   b. a tire pressure sensor coupled to the field, said pressure sensor having means for converting the field into D.C. current to operate the sensor, means in communication with the interior of the pneumatic tire for measuring the pressure in the pneumatic tire, and independent means for transmitting an electromagnetic signal indicating the pressure measured in the tire, and;
   c. a tire pressure signal processor means that receives the electromagnetic pressure signal from the transmitting means and displays the pressure measured in the tire.

2. The apparatus of claim 1 wherein said means in the tire pressure sensor for transmitting an electromagnetic signal is a FM transmitter operating with a carrier frequency in the frequency band of 2 kilohertz to 1 megahertz and the electromagnetic pressure signal is in the form of frequency modulation of the frequency of said carrier signal so that the carrier frequency is modulated by an amount proportional to the instantaneous value of a modulating signal which represents the pressure measured in the tire.

3. The apparatus of claim 1 wherein said field converting means provides the total power requirements of the pressure sensor, is energized exclusively by the field generating means and includes a full-wave rectifier for providing the D.C. current to operate the pressure sensor.

4. The apparatus of claim 1 wherein said field generating means is a power transmitter radiating continuous R.F. energy.

5. The apparatus of claim 1 wherein said field generating means is a magnetic field generating means that produces two flux loops through which the pressure sensor can pass.

6. Apparatus for remotely measuring the pressure in a pneumatic tire, comprising:
   a. a regulated DC power supply providing a constant voltage output;
   b. a RF oscillator connected to the regulated power supply;
   c. a RF amplifier connected to the RF oscillator;
   d. a flat coil transmitting antenna radiating a field of electromagnetic radiation, said coil antenna being connected to the RF amplifier;
   e. an impedence matching filter connected between the RF amplifier and the flat coil antenna;
   a tire pressure sensor coupled to the field of electromagnetic radiation radiated from the transmitting antenna, said pressure sensor having means for converting the electromagnetic radiation into power to operate the sensor, means in communication with the interior of the pneumatic tire for measuring the pressure in the penumatic tire, and means for transmitting an electromagnetic signal indicating the pressure measured in the tire, and;
   g. a tire pressure signal processor that receives the electromagnetic pressure signal from the pressure sensor and displays the pressure measured in the tire.

7. The apparatus of claim 6 wherein said flat coil transmitting antenna is locatable in the plane of a roadway so that the pneumatic tire can roll over the antenna while the tire pressure sensor is coupled to the electromagnetic field.

8. Apparatus for remotely measuring the pressure in a pneumatic tire, comprising:
   a. a power transmitter for generating a field of electromagnetic radiation;
   b. means proximate to the tire for receiving the electromagnetic radiation transmitted from the power transmitter and for providing electrical energy therefrom;
   c. a pressure transducer means in communication with the interior of the tire for measuring the pressure therein and generating a modulating signal which represents the pressure measured by the transducer;
   d. a FM transmitter, operating at a predetermined carrier frequency radiating a signal modulated such that the instantaneous frequency of said signal differs from the carrier frequency by an amount proportional to the instantaneous value of a modulating signal, said transmitter being powered by the electrical energy providing means; and
   e. a tire pressure signal processor that receives the frequency modulated signal from the FM transmitter and displays the pressure measured in the tire.

9. The apparatus of claim 8 wherein the electrical energy providing means further includes rectifying means for providing D.C. current from the radiation field, means for storing energy obtained from the D.C. current and for powering the FM transmitter with stored energy when the electromagnetic radiation receiving means is outside of the radiation field.

10. The apparatus of claim 8 wherein the FM transmitter radiates a coded signal identifying the pressure transducer and distinguishing it from other such transducers and the tire pressure signal processor displays both the pressure measured in the tire and the identification of the pressuretransducer.

11. The apparatus of claim 8 wherein the FM transmitter is a low frequency transmitter operating in the frequency band of 2 kilohertz to 1 megahertz.

12. Apparatus for remotely measuring the pressure in a pneumatic tire, comprising;
   a. a power transmitter for generating a field of electromagnetic radiation;
   b. a tire pressure sensor coupled to the field of electromagnetic radiation generated by the power transmitter, said pressure sensor having means for converting the electromagnetic radiaton into power to operate the sensor, means in communication with the interior of the pneumatic tire for measuring the pressure in the tire, and means for transmitting a frequency modulated signal indicating the measured pressure in the tire;
   c. a FM receiver for receiving the signal transmitted from the tire pressure sensor;
   d. a frequency synthesizer connected to the FM receiver for demodulating the frequency modulated pressure signal; and
   e. means connected to the output of the FM receiver for displaying the pressure measured in the tire.

13. The apparatus of claim 12 wherein said display means includes a frequency to voltage converter connected thereto and a digital volt meter also connected thereto having a visual digital output.

14. The apparatus of claim 12 wherein said display means includes a lamp driver and a go/no-go visual display connected thereto, said go/no-go display indicating whether the measured tire pressure is above or below, a minimum, predetermined value.

15. The apparatus of claim 12 further including a frequency to binary code converter connected to the output of the FM receiver and means connected to said converter for storing in binary code the pressure measured in the tire.

16. Apparatus for remotely measuring the pressure in a pneumatic tire, comprising;
   a. a power transmitter for generating a field of electromagnetic radiation;
   b. a flat coil transmitting antenna radiating a field of electromagnetic radiation, said coil antenna being connected to the power transmitter and being locatable in the plane of a roadway so that the pneumatic tire can roll over the antenna while passing through the electromagnetic field;
   c. means proximate to the tire for receiving the electromagnetic radiation transmitted from the power transmitter and for providing electrical energy therefrom;
   d. a magnetostrictive element in communication with the interior of the tire for measuring the pressure therein, said magnetostrictive element measures the absolute pressure in the tire without referring to a reference pressure;
   e. a FM transmitter proximate to the tire radiating a frequency modulated signal representing the pressure measured by the magnetostrictive element, said transmitter being powered by the electrical energy providing means;
   f. a FM receiver for receiving the frequency modulated signal transmitted from the FM transmitter;
   g. a frequency synthesizer connected to the FM receiver for demodulating the frequency modulated pressure signal; and
   h. means connected to the output of the FM receiver for displaying the pressure measured in the tire.

17. Apparatus for remotely measuring the pressures in a plurality of pneumatic tires mounted in tandem and for distinguishing between the measurements, comprising;
   a. a power transmitter for generating a field of electromagnetic radiation;
   b. a segmented transmitting antenna having a plurality of longitudinally spaced apart, in-line elements radiating a field of electromagnetic radiation, said segmented transmitting antenna being connected to the power transmitter;
   c. a tire pressure sensor proximate to each tire and coupled to the field of electromagnetic radiation generated by the power transmitter, each pressure sensor having means for coverting the electromagnetic radiation into power to operate the sensor, means in communication with the interior of the pneumatic tire for measuring the pressure in the pneumatic tire, and means for transmitting an electromagnetic signal indicating the measured pressure in the tire;
   d. a segmented antenna having a plurality of longitudinally spaced apart in-line elements receiving the electromagnetic signals from the tire pressure sensors; and
   e. a tire pressure signal processor connected to the segmented receiving antenna, said processor receives the electromagnetic pressure signals from the pressure sensors and displays the pressures measured in the tires.

18. The apparatus of claim 17 wherein both segmented antennas include at least two equally sized elements having the following dimensions:

$$B\ max \leq 2C\ min - L\ max$$

$$B\ min \geq C\ max + L\ max$$

$$B + A \geq 2C\ max$$

where, A is the length of each antenna segment; B is the distance from the leading edge of one antenna segment to the next leading edge of the succeeding antenna segment; C is the circumference of a tire; and L is the spacing between the centers of two tires mounted in tandem.

19. The apparatus of claim 18 wherein the signal processor further includes a time-based discrimination logic circuit for determining the sequence in which the tire pressure sensor radiate.

20. Apparatus for remotely measuring the pressures in a plurality of pneumatic tires mounted side by side and for distinguishing between the measurements, comprising;
   a. a power transmitter for generating a field of electromagnetic radiation;
   b. a plurality of parallel, laterally spaced apart and horizontally disposed elongate transmitting antennas, one transmitting antenna for each tire mounted side by side;
   c. a tire pressure sensor proximate to each tire and coupled to the field of electromagnetic radiation generated by the power transmitter, each pressure sensor having means for converting the electromagnetic radiation into power to operate the sensor, means for transmitting an electromagnetic signal indicated the measured pressure in the tire;
   d. a plurality of parallel, laterally spaced apart and horizontally disposed elongated receiving antennas, one receiving antenna for each tire mounted side by side; and
   e. a tire pressure signal processor connected to the receiving antenna, said processor receives the electromagnetic pressure signal for each pressure measured in each tire.

21. Apparatus for remotely measuring the pressure in a metal belted pneumatic tire, comprising:
   a. a power transmitter for generating a field of electromagnetic radiation;
   b. a flat coil transmitting antenna formed by turns of wire each having an increased lateral spacing therebetween as the distance from the center of the antenna increases, said antenna radiating a field of electromagnetic radiation and connected to the power transmitter;
   c. a tire pressure sensor coupled to the field of electromagnetic radiation generated by the power transmitter, said pressure sensor having means for converting the electromagnetic radiation into power to operate the sensor, means in communciation with the interior of the tire for measuring the pressure in the tire and means for transmitting an electromagnetic signal indicating the measured pressure in the tire; and
   d. a tire pressure signal processor that receives the electromagnetic pressure signal from the pressure sensor and displays the pressure measured in the tire.

22. Apparatus for remotely measuring the pressure in a metal belted pneumatic belted tire, comprising;
   a. a power transmitter for generating a field of electromagnetic radiation;
   b. a tire pressure sensor coupled to the field of electromagnetic radiation generated by the power transmitter, said pressure sensor having a receiving antenna positioned for sensitivity to magnetic vector component of the electromagnetic radiation, means connected to the antenna for converting the received radiation into power to operate the senor, means in communication with the interior of the tire for measuring the pressure in the tire and means for transmitting an electromagnetic signal indicating the pressure measured in the tire; and
   c. a tire pressure signal processor that receives the electromagnetic pressure signal from the pressure sensor and displays the pressure measured in the tire.

23. Apparatus for measuring the pressure in a pneumatic tire and for transmitting the pressure measurement to a location remote from the tire comprising:
   a. a quantitative pressure transducer in communication with the interior of the tire for measuring the quantitative magnitude of the pressure therein;
   b. means connected to the pressure transducer for transmitting to a location remote from the tire an electromagnetic signal indicating the quantitative magnitude of the pressure measured in the tire;
   c. means for powering the transmitting means from energy obtained from a field of electromagnetic radiation directed at the tire.

24. The apparatus of claim 23 wherein the pressure transducer is a magnetostrictive element that measures the absolute pressure in the tire without referring to a reference pressure.

25. The apparatus of claim 24 wherein the magnetostrictive element is a ferrite toroid.

26. The apparatus of claim 23 wherein the transmitting means is a FM transmitter and the electromagnetic pressure signal is frequency modulated.

27. The apparatus of claim 26 wherein the magnetostrictive element is current controlled and the FM transmitter connected thereto includes a FM oscillator circuit.

28. Apparatus for measuring the pressure in a pneumatic tire and for transmitting the pressure measurement to a location remote from the tire, comprising;
 a. a receiving antenna for picking up energy from a field of electromagnetic radiation directed at the tire;
 b. a FM oscillator connected to the receiving antenna and powered by the energy therefrom;
 c. a pressure transducer in communication with the interior of the tire for measuring the pressure therein and for generating a modulating signal which represents the measured pressure;
 d. a FM transmitter having a predetermined carrier frequency operatively connected to and driven by said FM oscillator and also connected to the pressure transducer for transmitting to a location remote from the tire a modulated electromagnetic signal having an instantaneous frequency which differs from said carrier frequency by an amount proportional to the instantaneous value of said signal which represents the pressure measured in the tire; and
 e. a transmitting antenna connected to said FM transmitter.

29. The apparatus of claim 28 further including a regulator connected to the receiving antenna for stabilizing the voltage obtained from the receiving antenna and applied to the FM oscillator.

30. The apparatus of claim 28 further including means for storing energy obtained from the receiving antenna and for powering the FM oscillator with the stored energy when the receiving antenna is outside of the field of electromagnetic radiation, said energy storing means being connected to the receiving antenna.

31. The apparatus of claim 28 further including an elastomeric housing means retaining the receiving antenna, the frequency modulated oscillator, the pressure transducer, the frequency modulated transmitter, and the transmitting antenna within the tire and bonded to the inner wall thereof.

32. The apparatus of claim 28 further including a spherical housing means enclosing the receiving antenna, the frequency modulated oscillator, the pressure transducer, the frequency modulated transmitter and transmitting antenna, said housing means being introduceable inside of the tire as a free rolling element.

33. The apparatus of claim 28 further including a housing means retaining the receiving antenna, the frequency modulated oscillator, the pressure tranducer, the frequency modulated transmitter, and the transmitting antenna within the tire and embedded within the tire casing.

34. The apparatus of claim 28 further including a housing means having both an elongate shaft enclosing the pressure transducer and communicating with the interior of the tire and a base exterior of the tire attached to the shaft retaining the receiving antenna, the frequency modulated oscillator, the frequency modulated transmitter, and the transmitting antenna.

35. Method for remotely indicating the pressure in a pneumatic tire, comprising the steps of:
 a. generating an electromagnetic field;
 b. disposing the tire in the field;
 c. coupling to said field to generate power within the field,
 d. employing said power to radiate an electromagnetic signal indicative of the quantitive magnitude of the pressure within the tire;
 e. receiving said electromagnetic signal; and
 f. converting said receiving signal into a quantitative indication of the pressure within the tire.

36. Method for remotely indicating the pressure in a pneumatic tire, comprising the steps of:
 a. generating a field of electromagnetic radiation;
 b. disposing the pneumatic tire in the field;
 c. coupling a tire pressure sensor to said field;
 d. converting the electromagnetic radiation into power to operate the pressure sensor;
 e. measuring quantitatively the magnitude of the pressure in the tire with the tire pressure sensor;
 f. transmitting an electromagnetic signal indicating the quantitative magnitude of the pressure measured in the tires;
 g. receiving the electromagnetic pressure signal with a tire pressure signal processor; and
 h. displaying the quantitative magnitude of the pressure measured in the tire.

37. The method of claim 36 wherein the step of converting the electromagnetic radiation into power exclusively supplies all of the energy requirements of the tire pressure sensor.

38. The method of claim 36 further including the steps of coding the electromagnetic signal from the tire pressure sensor so that the pressure sensor is identifiable and displaying the identification of the pressure sensor with the corresponding pressure measured in the tire.

39. The method of claim 36 further including the steps of storing the energy obtained from the electromagnetic field and powering the tire pressure sensor with the stored energy when the pressure sensor is outside of the electromagnetic field.

40. Apparatus for remotely measuring the pressure in a pneumatic tire, comprising:
 a. a magnet for generating a magnetic field;
 b. a tire pressure sensor coupled to the magnetic field, said pressure sensor having a conductor therein for inducing a current from the field to operate the sensor, means in communication with the interior of the pneumatic tire for measuring the pressure in the pneumatic tire, and means for transmitting an electromagnetic signal indicating the pressure measured in the tire;
 c. means for moving the conductor with respect to the magnetic field; and
 d. a tire pressure signal processor means that receives the electromagnetic pressure signal from the pressure sensor and displays the pressure measured in the tire.

41. The apparatus of claim 40 wherein said magnet is a permanent magnet.

42. The apparatus of claim 40 wherein said magnet is an electro-magnet.

43. The apparatus of claim 40 wherein said magnet is a self-focusing permanent magnet.

44. The apparatus of claim 40 further including means for focusing the magnetic field generated by the magnet onto the tire.

45. The apparatus of claim 40 further including a second magnet mounted opposite to the first named magnet and joined thereto by a magnetically permeable material.

46. Apparatus for remotely measuring the pressure in a pneumatic tire, comprising;
   a. a magnet for generating a magnetic field proximate to the tire;
   b. a movable conductor for inducing a current from the field;
   c. means for moving said conductor with respect to the field;
   d. rectifying means for commutating into D.C. current the current induced in the conductor;
   e. a pressure transducer in communication with the interior of the tire for measuring the pressure therein;
   f. a FM transmitter proximate to the tire radiating a frequency modulated signal representing the pressure measured by the transducer, said transmitter being powered by the D.C. current means; and
   g. a tire pressure signal processor that receives the frequency modulated signal from the FM transmitter and displays the pressure measured in the tire.

47. The apparatus of claim 46 wherein the magnetostrictive element is current controlled and the FM transmitter connected thereto includes a frequency modulated oscillator circuit that radiates a signal frequency modulated such that the instantaneous frequency of said signal differs from a carrier frequency by an amount proportional to the instantaneous value of a modulating signal which represents the pressure measured in the tire.

48. Apparatus for remotely measuring the pressure in a pneumatic tire, comprising:
   a. a magnet for generating a magnetic field;
   b. a tire pressure sensor coupled to the magnetic field, said pressure sensor having a conductor therein for inducing a current from the field to operate the sensor, means in communication with the interior of the pneumatic tire for measuring the pressure in the pneumatic tire, and means for transmitting an electromagnetic signal indicating the pressure measured in the tire,
   c. means for moving the conductor with respect to the magnetic field;
   d. a FM receiver for receiving the signal transmitted from the tire pressure sensor;
   e. a frequency synthesizer connected to the FM receiver for demodulating the frequency modulated pressure signal; and
   f. means connected to the output of the FM receiver for displaying the pressure measured in the tire.

49. The apparatus of claim 48 further including switch means attached to the FM receiver for sampling tire pressure signals from a plurality of tire pressure sensors.

50. The apparatus of claim 48 wherein said display means includes a frequency to voltage converter connected thereto and a digital volt meter also connected thereto having a visual digital output.

51. The apparatus of claim 48 wherein the display means includes alarm means for indicating an inadequate tire pressure.

52. Apparatus for remotely measuring the pressure in a pneumatic tire comprising:
   a. magnet for generating a magnetic field;
   b. means for focusing the magnetic field generated by the magnet onto the tire;
   c. a movable conductor for inducing a current from the magnetic field;
   d. means for moving said conductor with respect to the magnetic field;
   e. means for providing electrical energy from the current induced in the conductor;
   f. a pressure transducer in communication with the interior of the tire for measuring the pressure therein;
   g. a FM transmitter proximate to the tire radiating a frequency modulated signal representing the pressure measured by the transducer, said transmitter being powered by the electrical energy providing means;
   h. a FM receiver for receiving the signal transmitted from the FM transmitter;
   i. switch means attached to the FM receiver for sampling tire pressure signals from a plurality of tire pressure sensors;
   j. a frequency synthesizer connected to the FM receiver for demodulating the frequency modulated pressure signal; and
   k. means connected to the output of the FM receiver for displaying the pressure measured in the tire.

53. The apparatus of claim 52 wherein the pressure transducer is a magnetostrictive element in communication with the interior of the tire for measuring the pressure therein, said magnetostrictive element measures the absolute pressure in the tire without referring to a reference pressure.

54. Apparatus for remotely measuring the pressures in a plurality of pneumatic tires mounted on a vehicle and for indicating an out of tolerance tire pressure to the operator of the vehicle, comprising:
   a. a plurality of magnets for generating magnetic fields directed into the tires of the vehicle;
   b. a plurality of tire pressure sensors coupled to said magnetic fields, each of said pressure sensors being located proximate to a tire and having a conductor therein for inducing a current from the field to operate the sensor, each of said sensors further including a pressure transducer therein in communication with the interior of each tire for measuring the pressure therein and a FM transmitter radiating a frequency modulated signal representing the pressure measured by the transducer, said transmitter being powered by the current induced by the conductor;
   c. means for moving the plurality of conductors with respect to the magnetic fields;
   d. a FM receiver for receiving the signals transmitted from the tire pressure sensors;
   e. switch means attached to the FM receiver for sampling the tire pressure signals from said plurality of tire pressure sensors;
   f. a frequency synthesizer connected to the FM receiver for demodulating the frequency modulated pressure signals; and
   g. means connected to the output of the FM receiver for displaying to the operator the pressures measured in the tires and for indicating an inadequate tire pressure.

55. The apparatus of claim 54 wherein said switch means periodically and sequentially samples the tire pressure signals received from the plurality of tire pressure sensors.

56. Apparatus for measuring the pressure in a pneumatic tire and for transmitting the pressure measurement to a location remote from the tire, comprising;
  a. a quantitative pressure transducer in communication with the interior of the tire for measuring the magnitude of the pressure therein;
  b. means connected to the pressure transducer for transmitting to a location remote from the tire an electromagnetic signal indicating the quantitative magnitude of the pressure measured in the tire; and
  c. means for powering the transmitting means from electrical energy obtained by induction from a magnetic field directed at the tire.

57. The apparatus of claim 56 wherein the pressure transducer is a magnetostrictive element that measures the absolute pressure in the tire without referring to a reference pressure.

58. The apparatus of claim 57 wherein the magnetostrictive element is a ferrite toroid.

59. The apparatus of claim 56 wherein the transmitting means is a FM transmitter and the electromagnetic pressure signal is frequency modulated.

60. The apparatus of claim 59 wherein the magnetostrictive element is current controlled and the FM transmitter connected thereto includes a FM oscillator circuit.

61. Apparatus for measuring the pressure in a pneumatic tire and for transmitting the pressure measurement to a location remote from the tire, comprising;
  a. a conductor for inducing current from a magnetic field directed at the tire;
  b. a FM oscillator connected to the conductor and powered by the current therefrom;
  c. a pressure transducer in communication with the interior of the tire for measuring the pressure therein;
  d. a FM transmitter operatively connected to and driven by said FM oscillator and also connected to the pressure transducer for transmitting to a location remote from the tire an electromagetic signal frequency modulated such that the instantaneous frequency of said signal differs from a carrier frequency by an amount proportional to the instantaneous value of a modulating signal which represents the pressure measured in the tire; and
  e. a transmitting antenna connected to said FM transmitter.

62. Method for remotely indicating the pressure in a pneumatic tire, comprising the steps of:
  a. providing a magnetic field;
  b. moving the tire through the field so that magnetic flux lines are broken by a tire pressure sensor;
  c. inducing a current from the magnetic field by induction:
  d. measuring quantitatively the magnitude of the pressure in the tire;
  e. employing said current to radiate an electromagnetic signal indicative of the magnitude of the pressure measured in the tire;
  f. receiving the electromagnetic pressure signal with a tire pressure signal processor; and
  g. displaying the magnitude of the pressure measured in the tire.

63. The method of claim 62 further including the step of focusing the magnetic field directly onto the tire.

64. The method of claim 62 wherein the step of inducing a current from the field exclusively supplies all of the energy requirements of the tire pressure sensor.

65. Apparatus for remotely measuring the pressure in a pneumatic tire, comprising:
  a. means for generating a current inducing field;
  b. a tire pressure sensor coupled to the field, said pressure sensor having means for converting the field into power to operate the sensor, means in communication with the interior of the pneumatic tire for measuring the absolute pressure in the pneumatic tire without referring to a reference pressure, and means for transmitting an electromagnetic signal indicating the pressure measured in the tire, and;
  c. a tire pressure signal processor means that receives the electromagnetic pressure signal from the pressure sensor and displays the pressure measured in the tire.

66. Apparatus for remotely measuring the pressure in a pneumatic tire, comprising;
  a. a power transmitter for generating a field of electomagnetic radiation;
  b. means proximate to the tire for receiving the electromagnetic radiation transmitted from the power transmitter and for providing electrical energy thereform;
  c. a pressure transducer in communication with the interior of the tire for measuring the pressure therein, said pressure transducer being a magnetostrictive element that measures the absolute pressure in the tire without referring to a reference pressure;
  d. a FM transmitter proximate to the tire radiating a frequency modulated signal representing the pressure measured by the transducer, said transmitter being powered by the electrical energy providing means; and
  e. a tire pressure signal processor that receives the frequency modulated signal from the FM transmitter and displays the pressure measured in the tire.

67. The apparatus of claim 66 wherein the magnetostrictive element is current controlled and the FM transmitter is connected thereto includes a frequency modulated oscillator circuit.

68. Apparatus for remotely measuring the pressure in a pneumatic tire, comprising;
  a. a magnet for generating a magnetic field proximate to the tire;
  b. a movable conductor for inducing a current from the field;
  c. means for moving said conductor with respect to the field;
  d. means for providing electrical energy from the current induced in the conductor;
  e. a pressure transducer in communication with the interior of the tire for measuring the pressure therein, said transducer being a magnetostrictive element that measures the absolute pressure in the tire without referring to a reference pressure;
  f. a FM transmitter proximate to the tire radiating a frequency modulated signal representing the pressure measured by the transducer, said transmitter being powered by the electrical energy providing means; and
  g. a tire pressure signal processor that receives the frequency modulated signal from the FM transmitter and displays the pressure measured in the tire.

69. Apparatus for measuring the pressure in a pneumatic tire and for transmitting the pressure measurement to a location remote from the tire, comprising;

a. a conductor for inducing current from a magnetic field directed at the tire;
b. a FM oscillator connected to the conductor and powered by the current therefrom;
c. a regulator connected to the conductor for stabilizing the induced current obtained from the conductor and applied to the FM oscillator;
d. a pressure transucer in communication with the interior of the tire for measuring the pressure therein;
e. a FM transmitter operatively connected to and driven by said FM oscillator and also connected to the pressure transucer for transmitting to a location remote from the tire an electromagnetic signal indicating the pressure measured in the tire; and
f. a transmitting antenna connected to said FM transmitter.

* * * * *